United States Patent
Liu et al.

(10) Patent No.: US 10,191,786 B2
(45) Date of Patent: Jan. 29, 2019

(54) APPLICATION PROGRAM INTERFACE MASHUP GENERATION

(71) Applicant: FUJITSU LIMITED, Kawasaki-shi, Kanagawa (JP)

(72) Inventors: Lei Liu, San Jose, CA (US); Wei-Peng Chen, Fremont, CA (US); Qinghan Xue, Sunnyvale, CA (US)

(73) Assignee: FUJITSU LIMITED, Kawasaki (JP)

( * ) Notice: Subject to any disclaimer, the term of this patent is extended or adjusted under 35 U.S.C. 154(b) by 10 days.

(21) Appl. No.: 15/641,196

(22) Filed: Jul. 3, 2017

(65) Prior Publication Data

US 2019/0004872 A1 Jan. 3, 2019

(51) Int. Cl.
*G06F 9/54* (2006.01)

(52) U.S. Cl.
CPC ................... *G06F 9/541* (2013.01)

(58) Field of Classification Search
None
See application file for complete search history.

(56) References Cited

U.S. PATENT DOCUMENTS

2006/0156253 A1* 7/2006 Schreiber .......... G06F 17/30557
715/835
2014/0337372 A1* 11/2014 Lee .......................... G06F 8/30
707/767

OTHER PUBLICATIONS

Gu, Xiaodong, et al. "Deep API learning." Proceedings of the 2016 24th ACM SIGSOFT International Symposium on Foundations of Software Engineering. ACM, 2016.
Gao, Wei, et al. "Manifold-learning based API recommendation for mashup creation." Web Services (ICWS), 2015 IEEE International Conference on. IEEE, 2015.
Pending U.S. Appl. No. 15/374,798, filed Dec. 9, 2016.

* cited by examiner

*Primary Examiner* — Craig C Dorais
(74) *Attorney, Agent, or Firm* — Maschoff Brennan

(57) ABSTRACT

A method of generating application program interface (API) mashups is provided. The method may include grouping a plurality of APIs into a plurality of sub-clusters based on at least one keyword for each of the plurality of APIs. The method may also include identifying at least one keyword combination for the one or more sub-clusters based on real-world data and two or more keywords for the plurality of sub-clusters. Further, the method may include determining one or more possible API mashups including two or more APIs of the plurality of APIs for the at least one keyword combination. In addition, the method may include determining a similarity score for each possible API mashup of the one or more possible API mashups. The method may also include identifying at least one API mashups from the one or more possible mashups based on the similarity score for each possible API mashup.

20 Claims, 6 Drawing Sheets

APPLICATION PROGRAM INTERFACE MASHUP GENERATION

FIELD

The embodiments discussed herein relate to application program interface (API) mashups.

BACKGROUND

An application programming interface (API) is a set of protocols, commands, protocols, definitions, and tools for creating application software. An API may specify how software components should interact and how APIs are used when programming graphical user interface (GUI) components or implementing services or functions. An API mashup is a plurality of APIs functioning together in order to provide new or value-added services.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of generating application program interface (API) mashups may include grouping, via at least one processor, a plurality of APIs into a plurality of sub-clusters based on at least one keyword for each API of the plurality of APIs. The method may further include identifying, via the at least one processor, at least one keyword combination for the one or more sub-clusters based on real-world data and two or more keywords for the plurality of sub-clusters. The method may also include determining, via the at least one processor, one or more possible API mashups including two or more APIs of the plurality of APIs for the at least one keyword combination. In addition, the method may include determining, via the at least one processor, a similarity score for each possible API mashup of the one or more possible mashups. Moreover, the method may include identifying, via the at least one processor, at least one API mashups from the one or more possible mashups based on the similarity score for each possible mashup of the one or more possible mashups.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Various embodiments disclosed herein relate to application program interface (API) mashup generation. In some embodiments, API mashups may be automatically identified and/or generated based on real-world data via text mining and/or natural language processing techniques. According to various embodiments, API mashups may be identified and/or generated based on word embedding (e.g., character and/or sentence-based word embedding) and/or named entity recognition (e.g., combination of different datasets for named entity recognition).

According to some embodiments, API mashups may be ranked based on the real-world data, and thus developers may not be required to search API methods to verify feasibility and usefulness of identified and/or generated API mashups. Embodiments disclosed herein are not limited to any particular use case, but rather may be used to develop applications for any suitable use case.

Conventionally, identifying suitable APIs to use in an application was burdensome and may have required manual and time-consuming searches across a diverse set of websites. Furthermore, information was primarily limited to a single API. Further, developers needed to search and select APIs, understand each API by reviewing documentation, and verify inputs and outputs to determine whether APIs may be combined.

Embodiments of the present disclosure will be explained with reference to the accompanying drawings.

Figure 1:
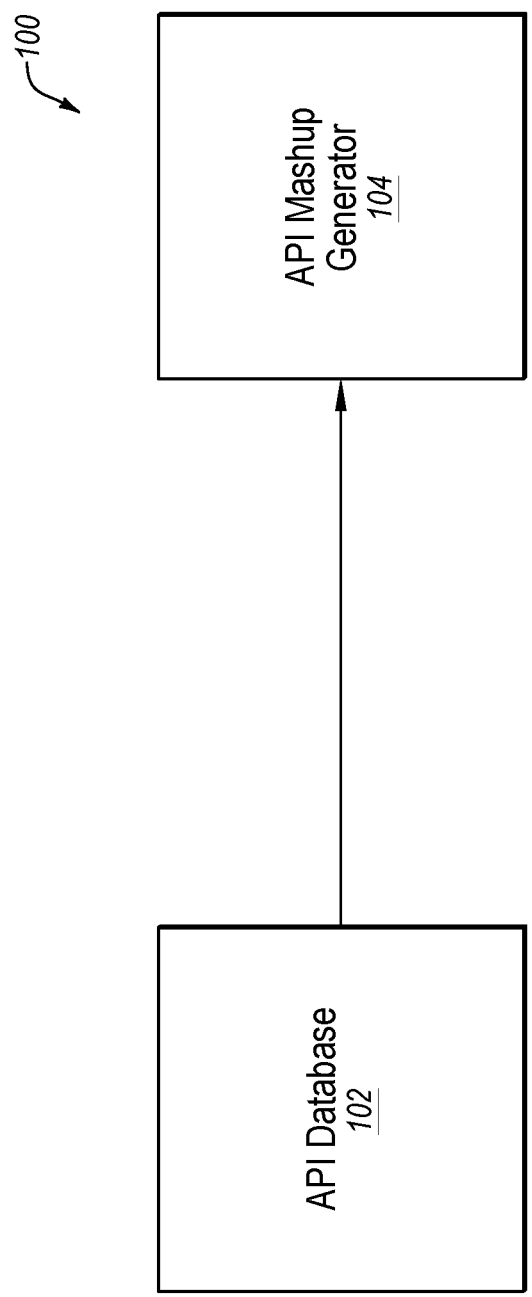
FIG. 1 a block diagram of an example system including an API mashup generator.

FIG. 1 is a block diagram of an example API mashup generation system 100 including an API database 102 and an API mashup generator 104. API database 102 may include a plurality of APIs (e.g., API1-APIn) and, in some embodiments, various API data, such as API endpoints, parameters, and their descriptions. API database 102 may include any computer-based source for APIs and/or API data. For example, API database 102 may include a server, client computer, repository, etc. API database 102 may store APIs and API data in any electronic format. Further, the API data may be machine-readable and/or human readable. The API data may be in any language. For example, the API data may be in any target human language (e.g., English, Japanese, German, etc.). The API may be in any structured data format. For example, the API data may be in Open API specification, JSON, XML, etc.

Each API of API database 102 may be associated with primary-category keywords (e.g., medical), second-category keywords (e.g., healthcare, business, office, etc.), and an API description. In some embodiments, API category keywords (e.g., primary and secondary category keywords) and/or API descriptions may be defined by a repository (e.g., a public repository, such as the ProgrammableWeb™).

API mashup generator 104 may be configured to receive APIs and/or API data from API database 102 and generate one or more API mashups, according to one or more embodiments as described herein.

Figure 2:
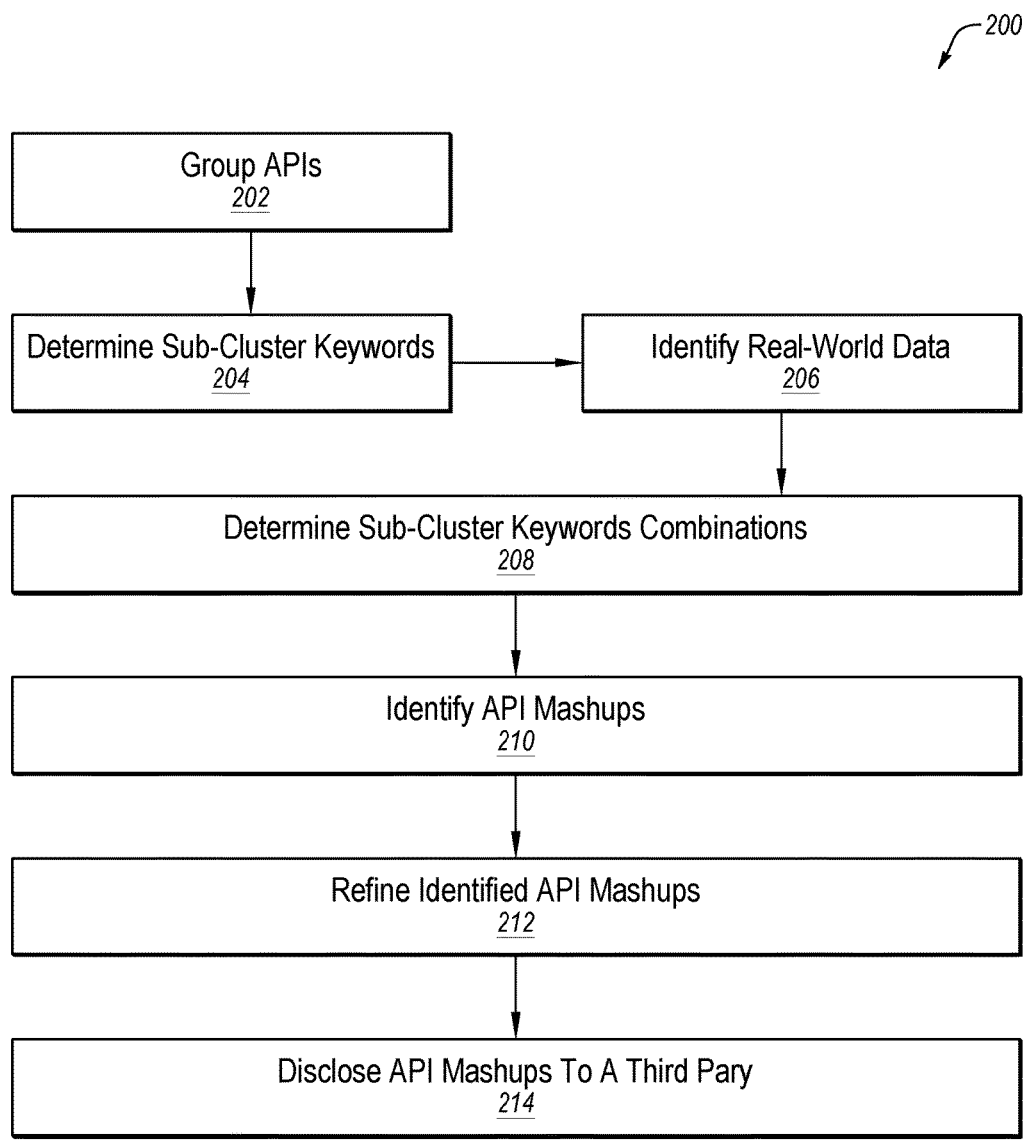
FIG. 2 shows an flow diagram of an example method of generating one or more API mashups.

FIG. 2 shows an example flow diagram of a method 200 of generating one or more API mashups, arranged in accordance with at least one embodiment described herein. Although illustrated as discrete blocks, various blocks may be divided into additional blocks, combined into fewer blocks, or eliminated, depending on the desired implementation.

Figure 6:
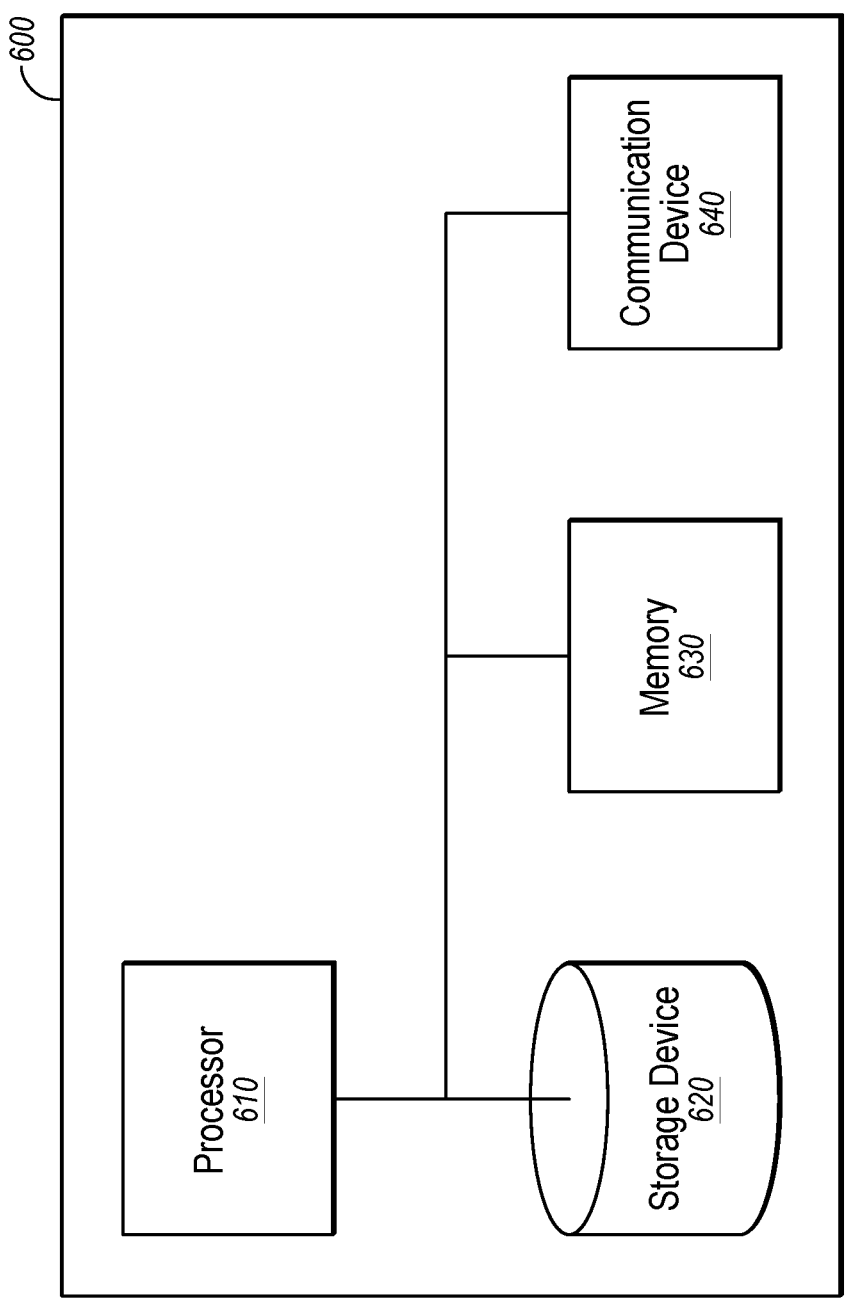
FIG. 6 is a block diagram of an example computing system.

In some embodiments, method 200 may be performed by one or more devices, such system 100 of FIG. 1 and/or system 600 of FIG. 6. For instance, processor 610 of FIG. 6 may be configured to execute computer instructions stored on memory 630 to perform functions and operations as represented by one or more of the blocks of method 200.

Method 200 may begin at block 202. At block 202, a plurality of APIs may be grouped. In some embodiments, the plurality of APIs may be grouped into categories, clusters, and/or sub-clusters. For example, the APIs, which may be received (e.g., extracted) from a database (e.g., API database 102 of FIG. 1) and/or a various sources (e.g., websites) may be grouped, via at least one processor (e.g., processor 610 of FIG. 6), according to an API tree structure (e.g., category, cluster, and sub-cluster, or more layers/levels). More specifically, for example, categories for API be generated via determining a frequency of every keyword in both category and primary-category fields of the APIs, ranking and selecting the keywords based on their frequency (e.g., machine classification), and selecting top keywords (e.g., M keywords) as categories for the API.

Further, clusters for APIs in each category may be generated. In some embodiments, text mining and/or natural language processing (NLP) techniques may be used to analyze the secondary category keywords. For example, "stopping" and/or general words may be removed, a word stemming operation may be performed, keywords may be counted and ranked based on frequency, and top keywords (e.g., N keywords) may be selected as clusters.

Moreover, sub-clusters for APIs in each cluster may be generated. In some embodiments, via text mining and/or NLP tools and/or techniques, descriptions of the APIs may be analyzed, similarity scores among refined keywords may be measured, and the top keywords (e.g., K keywords) may be selected as sub-clusters. More specifically, in some embodiments, the APIs may be grouped into different sub-clusters based on their categories and descriptions via, for example, text mining and NLP tools and/or techniques. For example, "stop" words and symbols may be removed, keyword types (e.g., noun, verb, etc.) may be determined, a word stemming operation may be performed, keywords may be counted and ranked based on frequency, similarity scores (e.g., using NLP techniques) among the keywords may be measured, and the top keywords (e.g., K keywords) may be selected as sub-clusters. Keyword similarity may be evaluated via any suitable metric (e.g., Levenshtein Distance, Euclidean Distance, Hamming Distance, Simhash, Minhash, Locality-sensitive Hashing (LSH), etc.).

In some embodiments, wherein real-world data is available (e.g., from one or more corresponding websites for each category), sub-cluster keyword combinations may be identified via named entity recognition and may be based on the sub-cluster keywords and the real-world data when the real-world data is available from one or more corresponding websites for each category; and In other embodiments, wherein real-world data may be unavailable, sub-cluster keyword combinations may be identified via identifying all possible sub-cluster keyword combinations of sub-cluster keywords and/or identifying sub-cluster keyword combination having sub-cluster keywords with a description frequency above a threshold (e.g., 5 occurrences, 10 occurrences, 20 occurrences, etc.).

At block 204, a plurality of sub-cluster keywords may be determined, and method 200 may proceed to block 206. More specifically, for example, the plurality of APIs may be grouped, via at least one processor (e.g., processor 610 of FIG. 6), into a plurality of sub-clusters based on at least one keyword for each of the plurality of APIs. Although method 200 is illustrated as proceeding from block 204 to block 206, the operation of block 206 may be independent of the operation of block 204. For example, block 204 may proceed to block 208.

Figure 3:
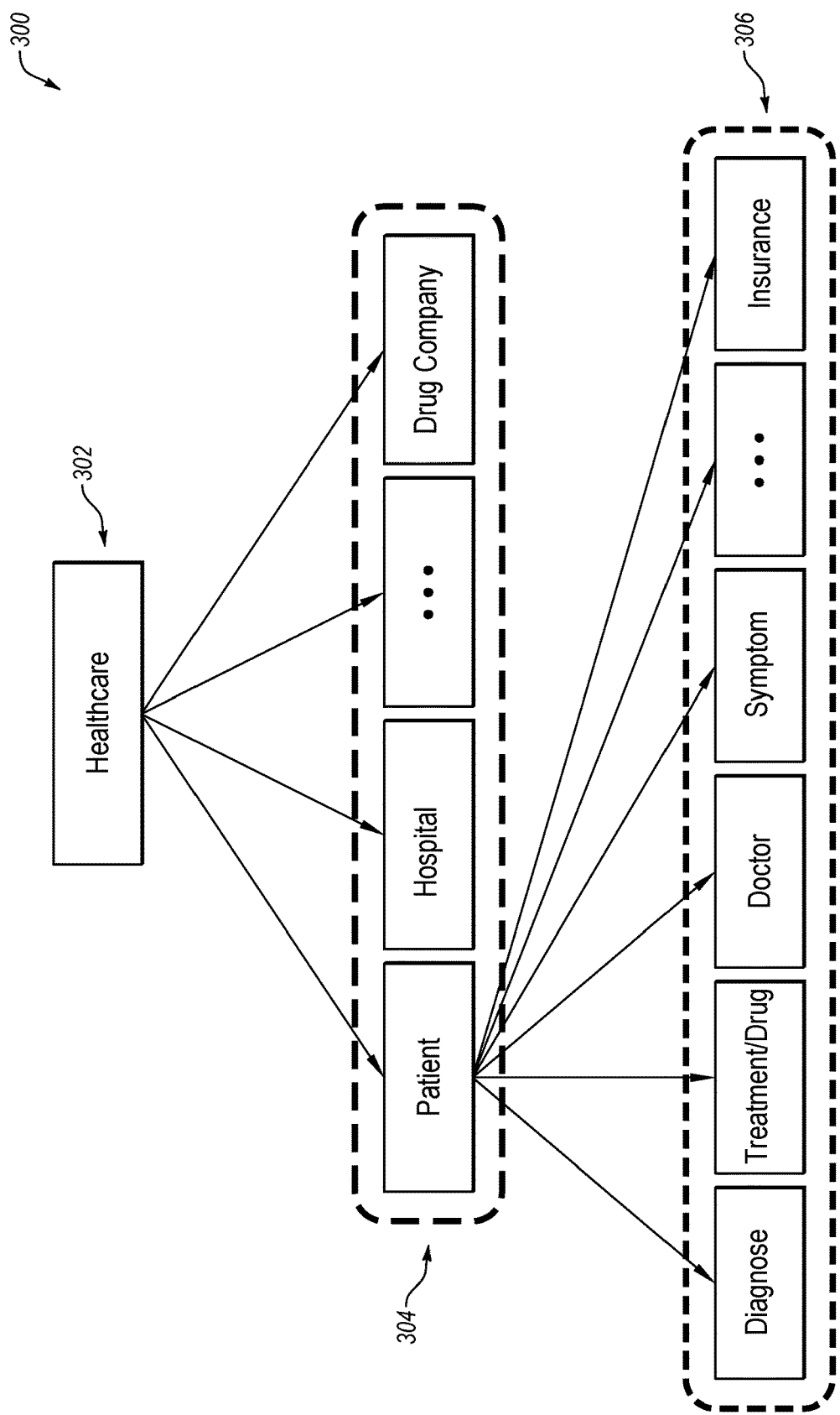
FIG. 3 illustrates an example API tree structure.

With reference to an example tree structure 300 illustrated in FIG. 3, a first level (e.g., a top level) 302 may include a category and/or primary-category keywords, a second level 304 may include secondary-category keywords, and a third level 306 may include keywords (e.g., determined via API descriptions). Third level 306 may include a plurality of sub-clusters, wherein each sub-cluster includes a keyword and one or more (e.g., several) APIs.

Although tree structure 300 is related to a healthcare domain, the present disclosure is not so limited. Rather, the embodiments described herein may be applicable to any domain, such as science, finance, business, education, e-commerce, etc.

Figure 4:
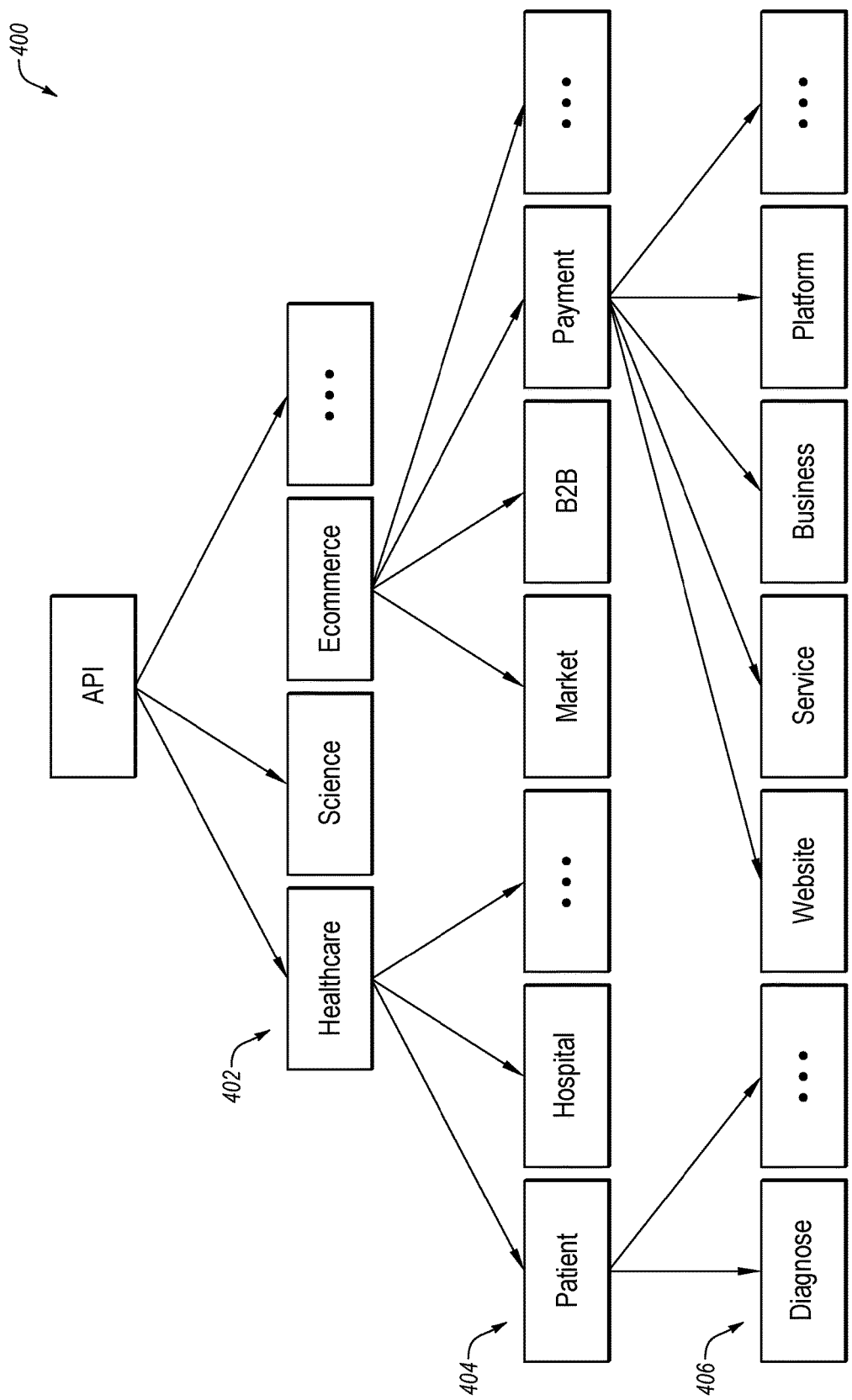
FIG. 4 illustrates another example API tree structure.

FIG. 4 illustrates another example tree structure 400. Structure 400 include a first level (e.g., top level) 402 including categories and/or primary-category keywords, a second level 404 including secondary-category keywords, and a third level 406 including keywords (e.g., determined via API descriptions). Third level 406 may include a plurality of sub-clusters, wherein each sub-cluster includes a keyword and one or more (e.g., several) APIs. In some embodiments, an API (e.g., authentication API), based on its keywords and description, may be grouped into multiple sub-clusters (e.g., in different domains).

With reference again to method 200 in FIG. 2, at block 206, real-world data (e.g., real-world questions) may be identified, and method 200 may proceed to block 208. For example, real-world data, which may include real-world questions, may be gathered via at least one processor (e.g., processor 610 of FIG. 6) (e.g., from the Internet via web crawlers). For example, for a healthcare specific domain, patient questions may be extracted from websites, such as professional healthcare related websites. In other example, for other domains, related information may be identified (e.g., via related web blogs) and web crawlers may be used to extract the relevant information. For example, in a finance related domain, data (e.g., questions) may be collected from one or more financial investment blogs (e.g. a Vanguard™ blog)

Figure 5:
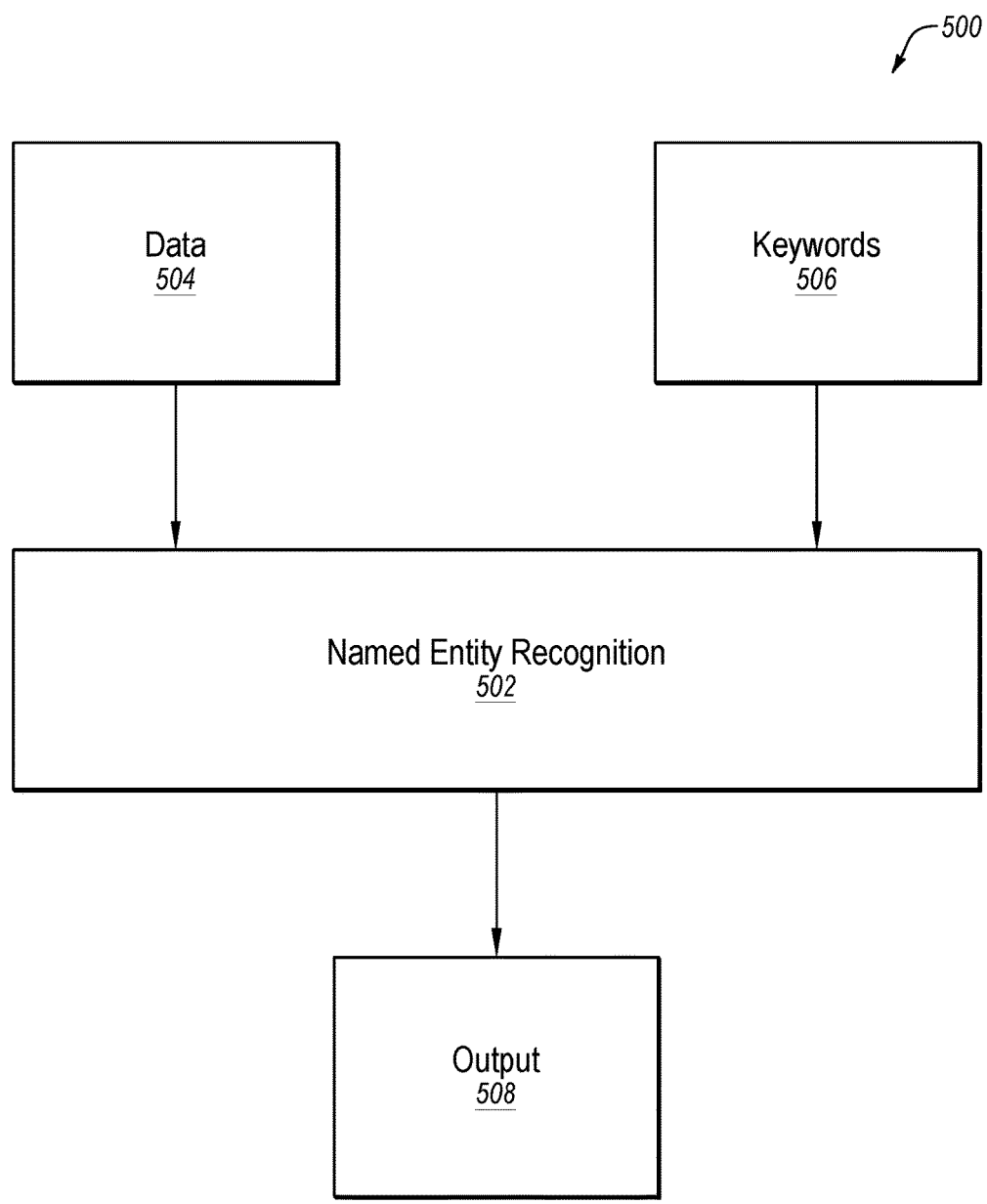
FIG. 5 depicts an example system including a named entity recognition tool.

At block 208, based on the identified data (e.g., real-world data) and the sub-cluster keywords, sub-cluster keyword combinations may be determined, and method 200 may proceed to block 210. As an example, at least one processor (e.g., processor 610 of FIG. 6), may be used for determining keyword combinations. More specifically, for example, useful sub-cluster combinations may be determined via named entity recognition techniques. For example, as illustrated in an example system 500 of FIG. 5, a named entity recognition tool 502 may receive data (e.g., real-world data, such as real-world questions) 504 and sub-cluster keywords 506, and generate an output 508 including a list of sub-cluster keyword combinations.

In some embodiments, keyword combination frequencies may be used to determine the popularity of sub-cluster keyword combinations. For example, at least one processor (e.g., processor 610 of FIG. 6), may be used for determining keyword combination frequencies. For example, approximately 50,000 clinical questions may be processed, and approximately 10,000 sub-cluster keyword combinations may be generated based on the clinical questions. In some embodiments, a keyword combination frequency may incremented when a collected question matches all the keywords for a given combination.

Based on sub-cluster keyword combinations and APIs in each sub-cluster, one or more possible API mashups including two or more APIs of the plurality of APIs may be determined (e.g., via at least one processor (e.g., processor 610 of FIG. 6)).

At block 210, API mashups may be identified, and method 200 may proceed to block 212. More specifically, for a given sub-cluster keyword combination, by choosing an API from each sub-cluster, all possible API mashups can be listed. Further a similarity analysis for each identified possible API mashup may be performed to identify, and possibly rank, API mashups.

For each API in an API mashup, a description is known. An API description may include a compressive summary for the given API, which may include, but not limited to API title and keywords, input/output parameters, API introduction, protocol formats, endpoint descriptions, input/output descriptions, etc. Each part of a description may be obtained and assembled from one or multiple sources (e.g. API related websites). Further, in some embodiments, a word vector for each description may be generated and an average value of a similarity score may be measured. The similarity analysis may be keyword-based, sentence-based, or both. For example, the similarity analysis may be performed via at least one processor (e.g., processor 610 of FIG. 6).

More specifically, in some embodiments, similarity analysis measurements may be based on descriptions of APIs. More specifically, the descriptions of each API in an API mashup may be separated into sentences, "stop" words and symbols may be removed, a word stemming operation may be performed, and NLP techniques may be used to convert each sentence into a word vector. Further, a hamming distance, for example, or other similarity metrics, among word vectors, may be computed. An average similarity score may be equal to sum(hamming distances)/total number of computations.

As an example, assuming the description of an API ("API1") includes two sentences (e.g., API1_$s1$ and API1_$s2$) and the description of another API ("API2") includes three sentences (e.g., API2_$s1$, API2_$s2$, and API2_$s3$), the hamming distance between every two sentences (Ham(API1_$s1$, API2_$s1$)) may be computed, and the similarity score may be equal to (Ham(API1_$s1$, API2_$s1$)+Ham(API1_$s1$, API2_$s2$)+Ham(API1_$s1$, API2_$s3$)+Ham(API1_$s2$, API2_$s1$)+Ham(API1_$s2$, API2_$s2$)+Ham(API1_$s2$, API2_$s3$))/6.

Further, in some embodiments, similarity analysis measurements may be based on keywords and descriptions of inputs and outputs of APIs (e.g., endpoint description and parameter description). For example, a word vector for each description may be generated and a value of the similarity score may be measured. As an example, if API1's output description has high similarity score with API2's input description, the two APIs may be combined as, for example, API2(API1).

At block 212, the identified API mashups may be refined, and method 200 may proceed to block 214. For example, after API mashups are identified and/or generated based on API description similarity analysis and/or input/output matching similarity analysis, the results may be filtered to refine and/or rank the identified API mashups (e.g., via at least one processor (e.g., processor 610 of FIG. 6)) and API mashups may be recommended. For example, the results may be refined and/or ranked via comparing the identified API mashups to one or more public repositories (e.g., API Harmony™, Github™, ProgrammableWeb™, etc.).

More specifically, for example, given a determined API mashup, a repository may be searched to attempt to identify the determined mashup. If the repository identifies the APIs of the determined mashup as being related (e.g., used in a project), the API mashup may be recommended (e.g., with a higher priority). For example, Validic API and Fitbit API are used in some Github projects and, thus, an API mashup including Validic API and Fitbit API may be recommended with a higher priority. As another example, for a given API mashup as an input, if related information in at least one repository is located, showing the APIs in the given API mashup are related, the API mashup may be recommended with a higher priority (e.g., to an application developer).

At block 214, API mashups may be disclosed to (e.g., recommended to) one or more third parties (e.g., application developers). For example, after an API mashup has been identified, and possibly ranked, the API mashup may be disclosed to (e.g., recommend to and/or provided to) at least one third party (e.g., an application developer).

Modifications, additions, or omissions may be made to method 200 without departing from the scope of the present disclosure. For example, the operations of method 200 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

In one contemplated example operation, a sub-cluster keyword combination may include "<security, administration>". This keyword combination may be obtained from real-world data collection and analysis. In this example, the "security" sub-cluster, includes a first API "API1" and a second API "API2". Further, the "administration" sub-cluster, includes a third API "API3" and a fourth API "API4". Continuing with this example, four possible API mashups may be identified (e.g., <API1, API3>, <API1, API4>, <API2, API3>, and <API2, API4>). Further, via APIs descriptions, a similarity score (e.g., determined via a similarity analysis) for each possible API mashup may be calculated to identify API mashups. According to some examples, the greater the similarity score, the more plausible the API mashup. In some embodiments, the identified API mashups may be ranked, and possibly recommend to one or more third parties.

FIG. 6 is a block diagram of an example computing system 600, in accordance with at least one embodiment of the present disclosure. For example, system 100 (see FIG. 1), system 500 (see FIG. 5), or one or more components thereof, may be implemented as computing system 600. Computing system 600 may include a desktop computer, a laptop computer, a server computer, a tablet computer, a mobile phone, a smartphone, a personal digital assistant (PDA), an e-reader device, a network switch, a network router, a network hub, other networking devices, or other suitable computing device.

Computing system 600 may include processor 610, a storage device 620, a memory 630, and a communication device 640. Processor 610, storage device 620, memory 630, and/or communication device 640 may all be communicatively coupled such that each of the components may communicate with the other components. Computing system 600 may perform any of the operations described in the present disclosure.

In general, processor 610 may include any suitable special-purpose or general-purpose computer, computing entity, or processing device including various computer hardware or software modules and may be configured to execute instructions stored on any applicable computer-readable storage media. For example, processor 610 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 6, processor 610 may include any number of processors configured to perform, individually or collectively, any number of operations described in the present disclosure.

In some embodiments, processor 610 may interpret and/or execute program instructions and/or process data stored in storage device 620, memory 630, or storage device 620 and memory 630. In some embodiments, processor 610 may fetch program instructions from storage device 620 and load the program instructions in memory 630. After the program instructions are loaded into memory 630, processor 610 may execute the program instructions.

For example, in some embodiments one or more of the processing operations of a device and/or system (e.g., an application program, a server, etc.) may be included in data storage 620 as program instructions. Processor 610 may fetch the program instructions of one or more of the processing operations and may load the program instructions of the processing operations in memory 630. After the program instructions of the processing operations are loaded into memory 630, processor 610 may execute the program instructions such that computing system 600 may implement the operations associated with the processing operations as directed by the program instructions.

Storage device 620 and memory 630 may include computer-readable storage media for carrying or having computer-executable instructions or data structures stored thereon. Such computer-readable storage media may include any available media that may be accessed by a general-purpose or special-purpose computer, such as processor 610. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause processor 610 to perform a certain operation or group of operations.

In some embodiments, storage device 620 and/or memory 630 may store data associated with an API mashup generation system (e.g., API mashup generation system 100 of FIG. 1). For example, storage device 620 and/or memory 630 may store APIs, API information (e.g., keywords, parameter descriptions, endpoint descriptions, categories, clusters, sub-clusters, etc.), and/or any other data related to an API mashup generation system.

Communication device 640 may include any device, system, component, or collection of components configured to allow or facilitate communication between computing system 600 and another electronic device. For example, communication device 640 may include, without limitation, a modem, a network card (wireless or wired), an infrared communication device, an optical communication device, a wireless communication device (such as an antenna), and/or chipset (such as a Bluetooth device, an 802.6 device (e.g. Metropolitan Area Network (MAN)), a Wi-Fi device, a WiMAX device, cellular communication facilities, etc.), and/or the like. Communication device 640 may permit data to be exchanged with any network such as a cellular network, a Wi-Fi network, a MAN, an optical network, etc., to name a few examples, and/or any other devices described in the present disclosure, including remote devices.

Modifications, additions, or omissions may be made to FIG. 6 without departing from the scope of the present disclosure. For example, computing system 600 may include more or fewer elements than those illustrated and described in the present disclosure. For example, computing system 600 may include an integrated display device such as a screen of a tablet or mobile phone or may include an external monitor, a projector, a television, or other suitable display device that may be separate from and communicatively coupled to computing system 600.

As used herein, the terms "module" or "component" may refer to specific hardware implementations configured to perform the operations of the module or component and/or software objects or software routines that may be stored on and/or executed by, for example, API mashup generator 104. In some embodiments, the different components and modules described herein may be implemented as objects or processes that execute on a computing system (e.g., as separate threads). While some of the systems and methods described herein are generally described as being implemented in software (stored on and/or executed by system 600), specific hardware implementations or a combination of software and specific hardware implementations are also possible and contemplated. In this description, a "computing entity" may include any computing system as defined herein, or any module or combination of modules running on a computing device, such as system 600.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In the present disclosure, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method of generating application program interface (API) mashups, the method comprising:
   grouping, via at least one processor, a plurality of APIs into a plurality of sub-clusters based on at least one keyword for each API of the plurality of APIs;
   identifying, via the at least one processor, at least one keyword combination for the plurality of sub-clusters based on real-world data and two or more keywords for the plurality of sub-clusters;
   determining, via the at least one processor, one or more possible API mashups including two or more APIs of the plurality of APIs for the at least one keyword combination;
   determining, via the at least one processor, a similarity score for each possible API mashup of the one or more possible API mashups; and
   identifying, via the at least one processor, at least one API mashup from the one or more possible API mashups based on the similarity score for each possible API mashups of the one or more possible API mashups.

2. The method of claim 1, wherein identifying the at least one API mashup comprises determining if the two or more APIs in the at least one API mashup are related in at least one API repository.

3. The method of claim 1, further comprising grouping each API of the plurality of APIs into one or more categories.

4. The method of claim 3, further comprising dividing each category of the one or more categories into one or more clusters.

5. The method of claim 4, wherein grouping the plurality of APIs into a plurality of sub-clusters comprises dividing the one or more clusters into the plurality of sub-clusters.

6. The method of claim 1, wherein determining the similarity score for each possible API mashup of the one or more possible API mashups comprises determining the similarity score based on at least one of a similarity of descriptions of the two or more APIs in the possible API mashup and a similarity of input parameters, output parameters and descriptions of the two or more APIs in the possible API mashup.

7. The method of claim 1, wherein grouping the plurality of APIs into the plurality of sub-clusters comprises:
   analyzing a description of each API of the plurality of APIs;
   measuring similarities of identified keywords of each API of the plurality of APIs; and
   selecting each keyword of a subset of the identified keywords as a sub-cluster.

8. The method of claim 1, further comprising disclosing the at least one API mashup to at least one third party.

9. The method of claim 1, further comprising:
   identifying sub-cluster keyword combinations via named entity recognition and based on the sub-cluster keywords and the real-world data when the real-world data is available from one or more corresponding websites for each category; and
   identifying, when the real-world data is unavailable, the sub-cluster keyword combinations via one of:
      identifying all possible sub-cluster keyword combinations of sub-cluster keywords; and
      identifying sub-cluster keyword combination having sub-cluster keywords with a description frequency above a threshold.

10. One or more non-transitory computer-readable media that include instructions that, when executed by one or more processing systems, are configured to cause the processing system to perform operations, the operations comprising:
   grouping a plurality of application program interfaces (APIs) into a plurality of sub-clusters based on at least one keyword for each API of the plurality of APIs;
   identifying at least one keyword combination for the plurality of sub-clusters based on real-world data and two or more keywords for the plurality of sub-clusters;
   determining one or more possible API mashups including two or more APIs of the plurality of APIs for the at least one keyword combination;
   determining a similarity score for each possible API mashup of the one or more possible API mashups; and
   identifying at least one API mashup from the one or more possible API mashups based on the similarity score of each possible API mashup of the one or more possible API mashups.

11. The computer-readable media of claim 10, wherein identifying the at least one API mashup comprises determining if the two or more APIs in the at least one API mashup are related in at least one API repository.

12. The computer-readable media of claim 10, further comprising grouping each API of the plurality of APIs into one or more categories.

13. The computer-readable media of claim 12, further comprising grouping each category of the one or more categories into one or more clusters.

14. The computer-readable media of claim 13, wherein grouping the plurality of APIs into a plurality of sub-clusters comprises grouping the one or more clusters into the plurality of sub-clusters.

15. A system, comprising:
one or more processors configured to:
    group a plurality of application program interfaces (APIs) into a plurality of sub-clusters based on at least one keyword for each of the plurality of APIs;
    identify at least one keyword combination for the plurality of sub-clusters based on real-world data and two or more keywords for the plurality of sub-clusters;
    determine one or more possible API mashups including two or more APIs of the plurality of APIs for the at least one keyword combination;
    determine a similarity score for each possible API mashup of the one or more possible API mashups; and
    identify at least one API mashup from the one or more possible API mashups based on the similarity score of each possible API mashup of the one or more possible API mashups.

16. The system of claim 15, wherein the one or more processors are further configured to determine if the two or more APIs in the at least one API mashup are related in at least one API repository to identify the at least one API mashup.

17. The system of claim 15, wherein the one or more processors are further configured to group each API of the plurality of APIs into one or more categories.

18. The system of claim 17, wherein the one or more processors are further configured to group each category of the one or more categories into one or more clusters.

19. The system of claim 18, wherein the one or more processors are further configured to group the one or more clusters into the plurality of sub-clusters to group the plurality of APIs into a plurality of sub-clusters.

20. The system of claim 15, wherein the one or more processors are further configured to determine the similarity score based on one of a similarity of descriptions of a first API and a second API in the possible API mashups and a similarity of an input of the first API in the possible API mashups with an output of the second API in the possible API mashups.

* * * * *